UNITED STATES PATENT OFFICE.

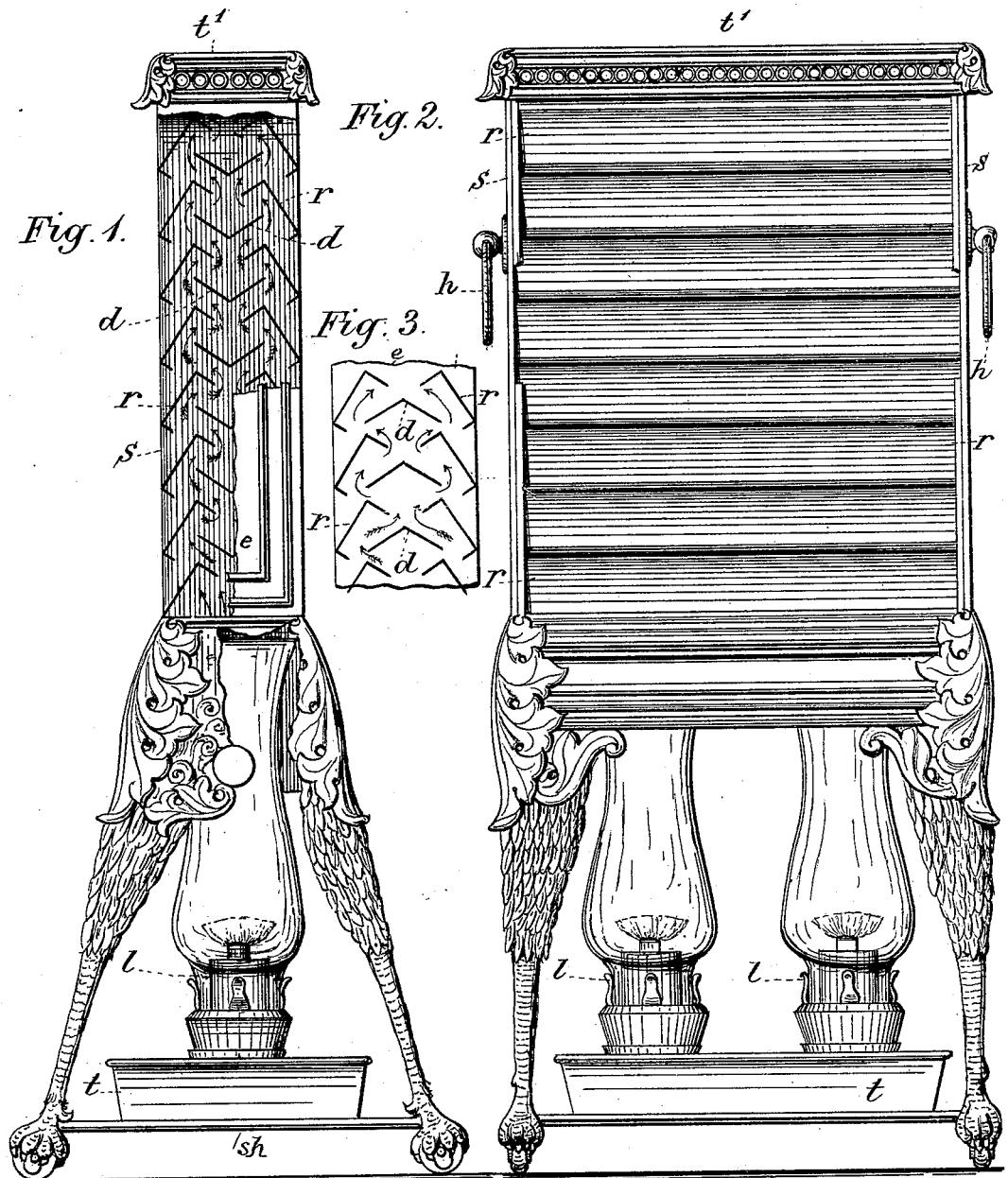

HENRY W. PLOUGH AND ERNEST N. GILES, OF INDIANAPOLIS, INDIANA.

PORTABLE HOT-AIR RADIATOR.

SPECIFICATION forming part of Letters Patent No. 420,390, dated January 28, 1890.

Application filed October 28, 1889. Serial No. 328,480. (No model.)

*To all whom it may concern:*

Be it known that we, HENRY W. PLOUGH, of Indianapolis, county of Marion, and State of Indiana, and ERNEST N. GILES, a resident of the same place, a subject of Victoria, Queen of Great Britain and Ireland, have invented certain new and useful Improvements in Portable Hot-Air Radiators; and we do hereby declare that the following is a full, clear, and exact description thereof, reference being had to the accompanying drawings, in which like letters refer to like parts.

Our invention relates to the construction of portable hot-air radiators for heating rooms, and will be understood from the following description.

In the drawings, Figure 1 represents an end view of our device, a part of the end broken away, showing the interior arrangement of the deflector and radiating-shutters. Fig. 2 is a front view of the same. Fig. 3 is a modified arrangement of the deflector and radiators, differing slightly from that shown in Fig. 1.

In detail our device consists of a case having closed ends $e$, the sides $s$ being open, formed of inclined radiating-shutters $r$, their ends supported in grooves or flanges formed on the end pieces $e$.

$t$ is the top, which is perforated or formed with openings to admit the free passage of the heat.

$d$ are the deflectors, which are preferably arranged in the manner shown in Fig. 1, their ends resting in grooves formed in the end pieces or upon flanges formed thereon.

$h$ are the handles for lifting the radiator-case.

In the modified form shown in Fig. 3 the deflectors $d$ are inverted with respect to their position shown in Fig. 1, the latter, however, being the preferable arrangement. This case rests upon legs, connected near the feet of which is a shelf $sh$, upon which is placed the oil-tank $t$ of the lamps $l$, the chimneys of the lamps extending upward in close proximity to the open bottom of the radiator, which is supported upon these legs, as shown in Figs. 1 and 2. The arrows indicate the direction of the heat-currents, these passing upward from the lamp, and, striking against the angular deflectors, are thrown off against the radiating-shelves $r$, the heat that passes the first set striking the second, and so on to the top. By this means the heat-currents are constantly intercepted and deflected, so as to strike against the radiating-shutters, which are thereby heated and give off heat through their openings and from their sides, these being arranged, as shown in Fig. 1, to admit the free passage and escape of the heat. The whole device is made light enough to be easily moved about, and is preferably mounted upon casters, as shown. By this arrangement of the deflector and radiators very little of the heat is lost, it being utilized and thrown out into the room.

We are aware that portable steam-radiators have been heretofore known and used, but are not aware that portable hot-air radiators have been constructed in the manner herein shown and described.

What we claim as our invention, and desire to secure by Letters Patent, is the following:

1. A portable hot-air radiator comprising a series of radiating-shutters, their tops inclined toward each other, and a central deflector placed between each pair of radiating-shutters, all supported in the end pieces of the case, substantially as shown and described.

2. A portable hot-air radiator comprising a case, a series of inclined radiating-shutters carried therein, and a central cone-shaped deflector located between such radiating-shutters, such radiator supported upon suitable legs above the lamp-heating mechanism, substantially as shown and described.

3. A portable hot-air radiator mounted upon legs, a series of inclined radiating-shutters supported in a case, and a series of cone-shaped deflectors set therein between each pair of radiating-shutters, in combination with suitable heating apparatus located beneath such radiator, substantially as shown and described.

In witness whereof we have hereunto set our hands this 23d day of September, 1889.

HENRY W. PLOUGH.
ERNEST N. GILES.

Witnesses:
C. P. JACOBS,
E. B. GRIFFITH.